United States Patent
To et al.

(10) Patent No.: US 9,056,550 B2
(45) Date of Patent: Jun. 16, 2015

(54) VEHICLE SPEED LIMITING AND/OR CONTROLLING SYSTEM THAT IS RESPONSIVE TO GPS SIGNALS

(75) Inventors: Viet Quoc To, West Bloomfield, MI (US); Payam Naghshtabrizi, Farmington Hills, MI (US); Sam Hashemi, Farmington Hills, MI (US); Zhang Yan, Northville, MI (US); John R. Blankenship, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 392 days.

(21) Appl. No.: 13/281,550

(22) Filed: Oct. 26, 2011

(65) Prior Publication Data

US 2013/0110367 A1    May 2, 2013

(51) Int. Cl.
*B60K 31/18* (2006.01)
*B60W 30/14* (2006.01)
*B60K 31/00* (2006.01)
*B60W 50/14* (2012.01)

(52) U.S. Cl.
CPC .............. *B60K 31/18* (2013.01); *B60K 31/0058* (2013.01); *B60W 30/146* (2013.01); *B60W 2550/402* (2013.01); *B60W 2050/143* (2013.01); *B60W 2550/22* (2013.01)

(58) Field of Classification Search
CPC ......... B60T 8/1755; B60T 8/172; B60T 7/22; B60W 10/18; B60W 10/184; B60W 30/146; B60W 2550/143; B60W 2250/402; B60W 2250/22; B60W 2050/143; B60K 31/18; B60K 31/0058

USPC ............ 701/70, 420, 94, 105, 110, 109, 108, 701/107, 106, 104, 400, 410; 123/357; 477/110
See application file for complete search history.

(56) References Cited

U.S. PATENT DOCUMENTS

| | | | | |
|---|---|---|---|---|
| 4,493,303 A | * | 1/1985 | Thompson et al. | 123/357 |
| 4,750,598 A | * | 6/1988 | Danno et al. | 477/110 |
| 5,019,986 A | * | 5/1991 | Londt et al. | 701/94 |
| 5,121,324 A | * | 6/1992 | Rini et al. | 701/105 |
| 5,224,045 A | * | 6/1993 | Stasell | 701/110 |
| 5,485,161 A | | 1/1996 | Vaughn | |
| 7,571,029 B2 | * | 8/2009 | Dai et al. | 701/1 |
| 7,671,727 B2 | * | 3/2010 | Flick | 340/466 |
| 7,739,036 B2 | * | 6/2010 | Grimm et al. | 701/420 |
| 2007/0158128 A1 | | 7/2007 | Gratz et al. | |
| 2007/0239331 A1 | | 10/2007 | Kaplan | |

* cited by examiner

*Primary Examiner* — James Trammell
*Assistant Examiner* — James E Stroud
(74) *Attorney, Agent, or Firm* — Frank A. MacKenzie; MacMillan, Sobanski & Todd, LLC

(57) ABSTRACT

A system includes a GPS receiver that generates a signal that is representative of a posted speed limit at a location where a vehicle is located and a device that generates a signal that is representative of an actual speed of the vehicle. A controller is responsive to the GPS receiver signal and the actual speed sensor signal for either (1) generating an alarm or (2) limiting or otherwise controlling the speed of the vehicle when the actual speed of the vehicle is greater than the posted speed limit.

19 Claims, 4 Drawing Sheets

VEHICLE SPEED LIMITING AND/OR CONTROLLING SYSTEM THAT IS RESPONSIVE TO GPS SIGNALS

BACKGROUND OF THE INVENTION

This invention relates in general to systems that limit and/or otherwise control the speed of a vehicle in accordance with a desired maximum speed. In particular, this invention relates to an improved structure for such a vehicle speed limiting and/or controlling system that is responsive to signals generated from a global positioning satellite (GPS) system for determining a desired maximum speed and that affirmatively limits and/or otherwise controls the speed of the vehicle in accordance with that predetermined maximum speed.

Many modern vehicles are provided with one or more active safety and driver assist systems to improve safety and enhance the driving experience. One important focus of these systems is the speed at which a vehicle is operated. For example, the speed at which an inexperienced driver operates a vehicle may be of particular concern to the parent of the driver or the owner of the vehicle.

In one known active safety system of this general type, the actual speed of the vehicle is limited (i.e., prevented from exceeding) and/or otherwise controlled (i.e., affirmatively guided toward another speed) in accordance with a single predetermined maximum speed. This single predetermined maximum speed may be either permanently engaged by the manufacturer of the vehicle at a factory-preset magnitude or selectively engaged by the parent of the driver or the owner of the vehicle by means a programmable controller, such as is currently available under the Ford® MyKey® programmable speed limiting system. In either event, the single predetermined maximum speed is initially set at a desired magnitude. Thereafter, when the vehicle is operated at this predetermined maximum speed (or at a threshold speed that is a predetermined differential from the predetermined maximum speed), an alarm is generated to alert the driver. Additionally (or alternatively), an electronic controller provided in the vehicle is actuated to affirmatively limit and/or otherwise control the speed of the vehicle relative to the predetermined maximum speed.

Although these types of speed limiting and/or controlling systems are effective, it is known that the maximum safe speed at which a vehicle can be operated can vary in accordance with the location where the vehicle is being operated. For example, the maximum safe speed at which a vehicle can be operated on an expressway is much higher than the maximum safe speed the same vehicle can be operated on a neighborhood street. To address these differing operating environments, it is known to provide the vehicle with a speed limit sign recognition system. Such as system includes a vehicle-mounted camera that captures an image of a conventional speed limit sign posted on the side of a road. The captured image is fed to an image processor that generates a signal that is representative of the posted speed limit displayed on the speed limit sign. This posted speed limit signal is used to either generate an alarm to alert the driver or affirmatively limit and/or otherwise control the speed of the vehicle relative to the predetermined maximum speed (or both) in the manner described above. Unfortunately, these types of camera-based speed limit sign recognition systems are relatively complex and costly.

Unrelated to the above-described vehicle speed limiting and/or controlling systems, many vehicles are provided with a conventional global positioning satellite (GPS) navigation device. These well known GPS navigation devices (which may either be provided as an integral part of the vehicle or as a portable aftermarket unit) are programmed to display both the current location of the vehicle on a displayed map and the actual speed of the vehicle at that particular location. Additionally, some of these GPS navigation devices are further programmed to both display the posted speed limit at the current location of the vehicle and generate an alarm if the actual speed of the vehicle exceeds the posted speed limit at that location. However, conventional GPS navigation devices do not affirmatively limit and/or otherwise control the speed of the vehicle.

Thus, it would be desirable to provide an improved structure for a vehicle speed limiting and/or controlling system addresses the issues discussed above.

SUMMARY OF THE INVENTION

This invention relates to an improved structure for a vehicle speed limiting and/or controlling system that is responsive to signals generated from a global positioning satellite (GPS) system for determining a desired maximum speed and that affirmatively limits and/or otherwise controls the speed of the vehicle in accordance with that predetermined maximum speed. The system includes a GPS receiver that generates a signal that is representative of a posted speed limit at a location where a vehicle is located and a device that generates a signal that is representative of an actual speed of the vehicle. A controller is responsive to the GPS receiver signal and the actual speed sensor signal for either (1) generating an alarm or (2) limiting or otherwise controlling the speed of the vehicle when the actual speed of the vehicle is greater than the posted speed limit.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
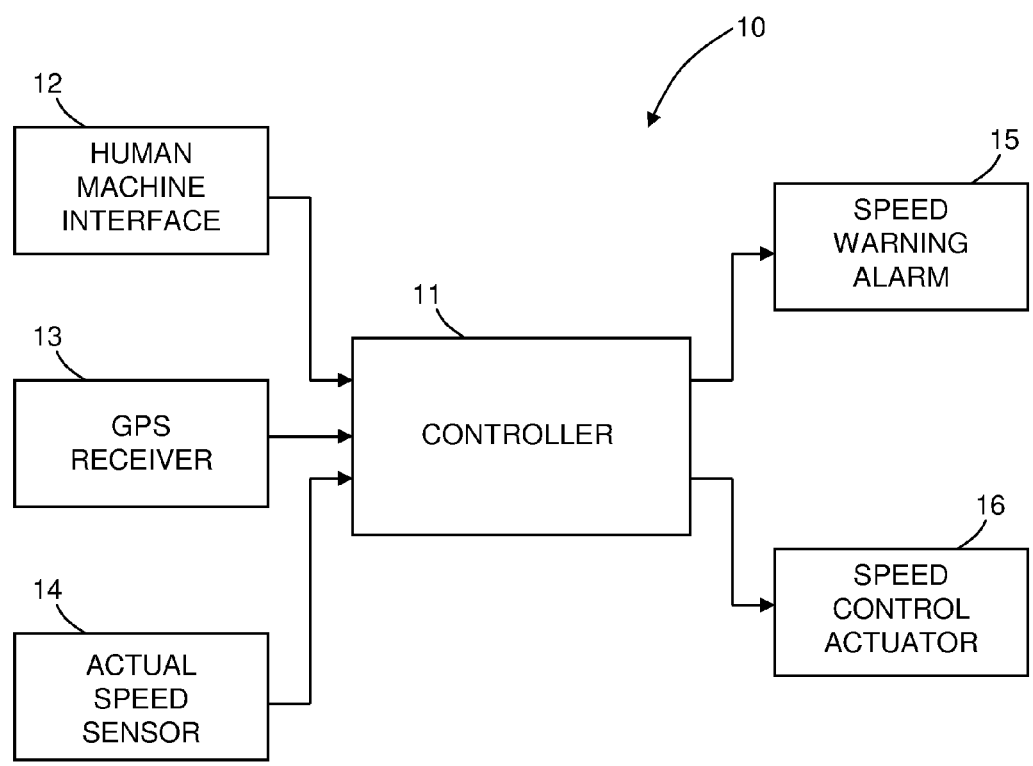
FIG. 1 is a block diagram of an improved structure for a vehicle speed limiting and/or controlling system in accordance with this invention.

Referring now to the drawings, there is illustrated in FIG. 1 a vehicle speed limiting and/or controlling system, indicated generally at 10, in accordance with this invention. The illustrated system 10 includes a controller 11, which may be embodied as any conventional microprocessor or other electronic control device. If desired, the controller 11 may be embodied as part of a conventional vehicle system controller that is provided within the vehicle and that typically coordinates the functions of major sub-systems therein, such as the engine, transmission, brakes, fuel supply, and the like.

The illustrated system 10 also includes a human-machine interface 12 that is connected to the controller 11. The human-machine interface 12 is, of itself, conventional in the art and may be embodied as any desired electronic device or circuit that can allow a person to generate one or more signals to the controller 11 that are representative of either (or both) of a (1) predetermined maximum speed at which the vehicle is to be operated or (2) predetermined differential speed variance from the predetermined maximum speed. The purposes of these predetermined maximum speed and predetermined differential speed variance signals will be explained below.

The illustrated system 10 further includes a GPS receiver 13. The GPS receiver 13 is, of itself, conventional in the art and is adapted to receive signals from one or more global positioning satellites and, in response thereto, generate one or more signals to the controller 11 that are representative of the posted speed limit at the current location of the road on which the vehicle is being operated. The GPS receiver 13 may, if desired, be embodied as a conventional GPS navigation device, such as described above. The GPS receiver 13 may either be provided as an integral part of the vehicle or as a portable aftermarket unit, including a cellular phone, tablet computer, or similar portable electronic device having GPS capabilities.

The illustrated system 10 also includes an actual vehicle speed sensor 14. The actual speed sensor 14 is, of itself, conventional in the art and is adapted to generate one or more signals to the controller 11 that are representative of the actual speed of the vehicle. For example, the actual speed sensor 14 may be embodied as a stand-alone sensor that is responsive to the rotation of a wheel or other component of the vehicle for generating the actual vehicle speed signal. If desired, however, the actual vehicle speed signal can be obtained directly from the controller 11 or some other existing component on the vehicle, in which instance the need for a separate actual speed sensor 14 would be obviated. Alternatively, the actual speed signal can be obtained directly from the GPS receiver 13, as described above, in which instance the need for a separate actual speed sensor 14 would also be obviated. As used herein, the terms "actual speed sensor" and "actual speed signal" are intended to cover all of these structures.

The illustrated system 10 includes two output mechanisms. First, the system 10 includes a speed warning alarm 15. The speed warning alarm 15 is, of itself, conventional in the art and is adapted to generate an indication to the driver that the actual speed of the vehicle is at or above a predetermined speed, as will be explained below. The speed warning alarm 15 may be of any desired nature including, but not limited to, audible alarms (such as the sounding of a beep or the playing of a recorded message), visual alarms (such as constant light or a flashing light), or tactile alarms (such as a vibration of the accelerator pedal or driver's seat), as well as any combination thereof. Second, the system 10 includes a speed control actuator 16. The speed control actuator 16 is, of itself, conventional in the art and is adapted to either limit and/or otherwise control the actual speed of the vehicle in accordance with a predetermined speed, as will also be explained below. The speed control actuator 16 may be of any desired nature including, but not limited to, throttle actuators and brake actuators, as well as any combination thereof.

Figure 2A:
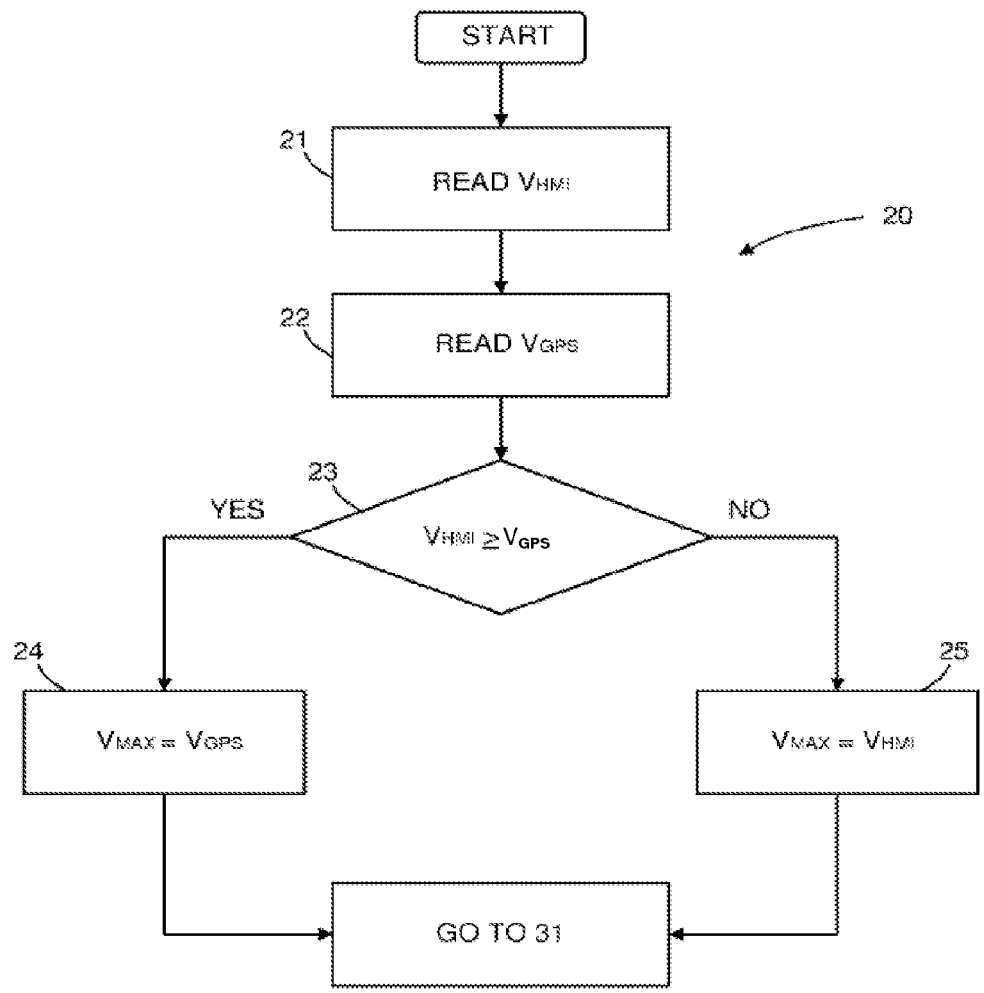
FIG. 2A is a flow chart of a first portion of a first embodiment of a method of operating the vehicle speed limiting and/or controlling system illustrated in FIG. 1.
Figure 2B:
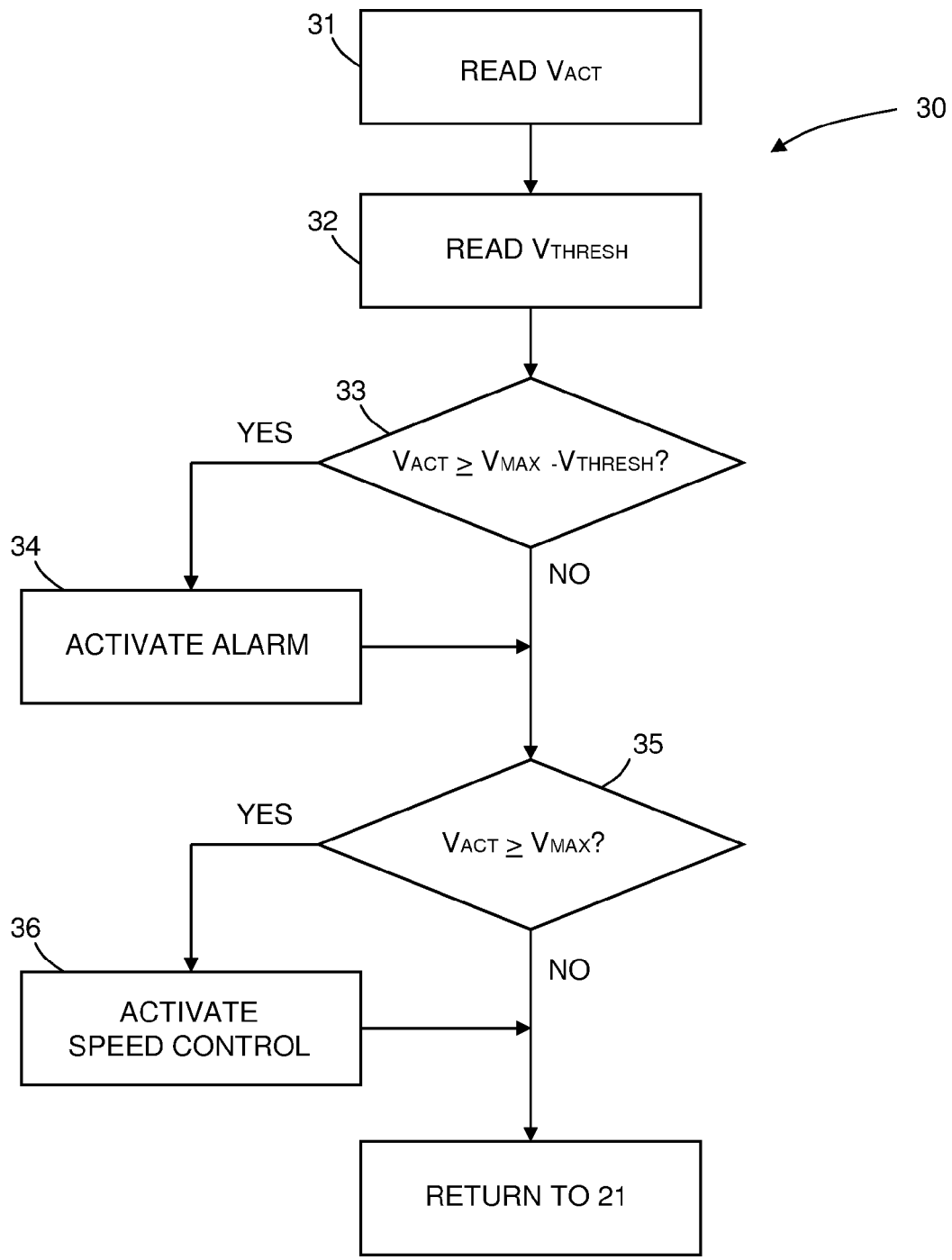
FIG. 2B is a flow chart of a second portion of the first embodiment of the method of operating the vehicle speed limiting and/or controlling system illustrated in FIG. 1.

FIGS. 2A and 2B are flow charts that illustrate a first embodiment of a method of operating the vehicle speed limiting and/or controlling system 10 illustrated in FIG. 1. FIG. 2A illustrates a first portion (indicated generally at 20) of that method, wherein the manner of determining a predetermined maximum speed of the vehicle is described. FIG. 2B illustrates a second portion (indicated generally at 30) of that method, wherein the manner of operating of the system 10 illustrated in FIG. 1 is described.

Referring now to FIG. 2A, the manner of determining a predetermined maximum speed of the vehicle is described. In an initial step 21 of this first portion of the method 20, the controller 11 reads the signals from the human-machine interface 12. As discussed above, the human-machine interface 12 can generate one or more signals to the controller 11 that are representative of a predetermined maximum speed at which the vehicle is desired to be operated. This predetermined maximum speed (referred to herein as $V_{HMI}$) can be set by a parent of the driver or the owner of the vehicle at any desired magnitude using the human-machine interface 12. For example, the predetermined maximum speed $V_{HMI}$ can be set at 70 m.p.h.

Next, as shown in step 22 of the first portion of the method 20, the controller 11 reads the signals from the GPS receiver 13. As mentioned above, the GPS receiver 13 can generate one or more signals to the controller 11 that are representative of the posted speed limit at the current location of the road on which the vehicle is being operated. This posted speed limit signal is referred to herein as $V_{GPS}$ and is determined by the GPS receiver 13 in response to the signals from one or more global positioning satellites, as discussed above.

The first portion of the method 20 next enters a decision point 23, wherein it is determined whether the predetermined maximum speed $V_{HMI}$ is greater than or less than the posted speed limit signal $V_{GPS}$. If the predetermined maximum speed $V_{HMI}$ is greater than (or, in the illustrated embodiment, greater than or equal to) the posted speed limit signal $V_{GPS}$, then the first portion of the method 20 branches from the decision point 23 to a step 24, wherein a calculated maximum speed $V_{MAX}$ is set equal to the posted speed limit signal $V_{GPS}$. On the other hand, if the predetermined maximum speed $V_{HMI}$ is less than the posted speed limit signal $V_{GPS}$, then the first portion of the method 20 branches from the decision point 23 to a step 25, wherein the calculated maximum speed $V_{MAX}$ is set equal to the predetermined maximum speed $V_{HMI}$. Thus, the calculated maximum speed $V_{MAX}$ is automatically set to be equal to the lower of the predetermined maximum speed $V_{HMI}$ and the posted speed limit signal $V_{GPS}$.

Referring now to FIG. 2B, the manner of operating of the system 10 illustrated in FIG. 1 is described. In an initial step 31 of this second portion of the method 30, the controller 11 reads the signals from the actual speed sensor 14. As discussed above, the actual speed sensor 14 generates one or more signals to the controller 11 that are representative of the actual speed of the vehicle (referred to herein as $V_{ACT}$).

Next, in an optional step 32 of the second portion of the method 30, the controller 11 reads additional signals from the human-machine interface 12. As discussed above, the human-machine interface 12 can also generate one or more signals to the controller 11 that are representative of a predetermined differential speed variance from the predetermined maximum speed (referred to herein as $V_{THRESH}$). This predetermined differential speed variance signal $V_{THRESH}$ can be set at any desired magnitude, such as 5 m.p.h. for example. It is contemplated that the human-machine interface 12 can alternatively generate signals to the controller 11 that are representative of more than one of the predetermined differential speed variances. For example, the human-machine interface 12 can generate a first predetermined differential speed variance $V_{THRESH1}$ at 5 m.p.h. and a second predetermined differential speed variance $V_{THRESH2}$ at 10 m.p.h.

Assuming that this predetermined differential speed variance signal $V_{THRESH}$ is provided, the second portion of the method 30 next enters a decision point 33, wherein it is determined whether the actual speed of the vehicle $V_{ACT}$ is greater than or less than the calculated maximum speed $V_{MAX}$ (as determined above) minus the predetermined differential speed variance signal $V_{THRESH}$. If the actual speed of the vehicle $V_{ACT}$ is greater than (or, in the illustrated embodiment, greater than or equal to) the calculated maximum speed $V_{MAX}$ minus the predetermined differential speed variance signal $V_{THRESH}$, then the second portion of the method 30 branches from the decision point 33 to a step 34, wherein the speed warning alarm 15 is actuated by the controller 11. Thus, the speed warning alarm 15 is adapted to generate an indication to the driver that the actual speed of the vehicle $V_{ACT}$ is approaching, but not yet reaching, the calculated maximum speed $V_{MAX}$. As suggested above, multiple indications of this can be generated if multiple predetermined differential speed variances $V_{THRESH1}$ and $V_{THRESH2}$ are provided. In either event, the driver of the vehicle can take appropriate actions (such as releasing the accelerator pedal or depressing the brake pedal of the vehicle) to avoid exceeding the speed defined by the calculated maximum speed $V_{MAX}$.

Next (or if it is determined in the decision point 33 that the actual speed of the vehicle $V_{ACT}$ is not greater than or equal to the calculated maximum speed $V_{MAX}$ minus the predetermined differential speed variance signal $V_{THRESH}$), the second portion of the method 30 enters a decision point 35, wherein it is determined whether the actual speed of the vehicle $V_{ACT}$ is either greater than or less than the calculated maximum speed $V_{MAX}$. If the actual speed of the vehicle $V_{ACT}$ is greater than (or, in the illustrated embodiment, greater than or equal to) the calculated maximum speed $V_{MAX}$, then the second portion of the method 30 branches from the decision point 35 to a step 36, wherein the speed control actuator 16 is actuated by the controller 11. Thus, the speed control actuator 16 is actuated to either limit and/or otherwise control the actual speed of the vehicle $V_{ACT}$ so that it does not exceed the calculated maximum speed $V_{MAX}$. To accomplish this, the speed control actuator 16 can cause appropriate actions (such as releasing the accelerator pedal or depressing the brake pedal of the vehicle) to avoid exceeding the speed defined by the calculated maximum speed $V_{MAX}$.

Next (or if it is determined in the decision point 35 that the actual speed of the vehicle $V_{ACT}$ is not greater than or equal to the calculated maximum speed $V_{MAX}$), the second portion of the method 30 returns to the step 21 of the first portion 20 of the method. Thus, the method 20 is continuously repeated as the vehicle is operated.

Figure 3:
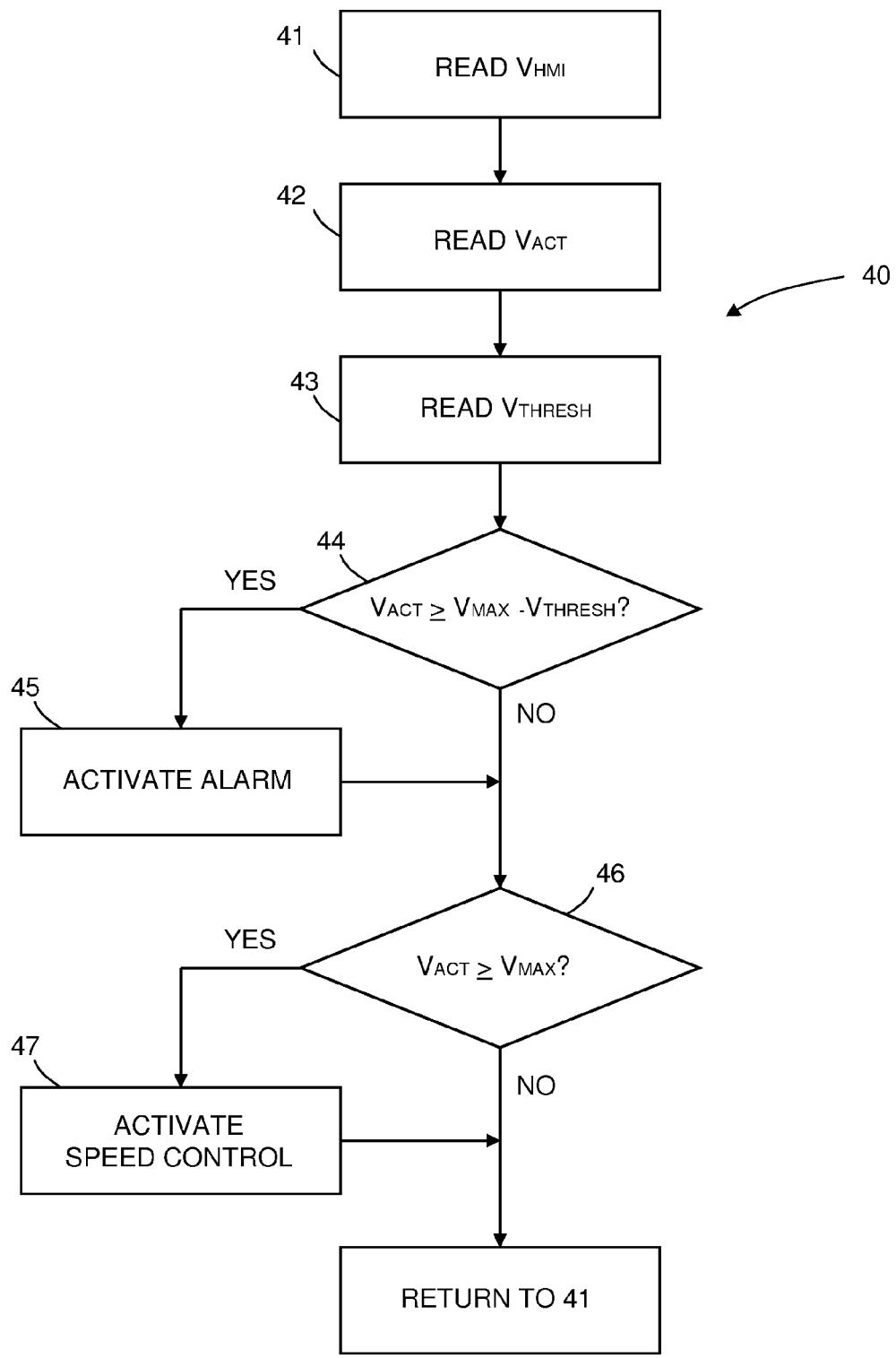
FIG. 3 is a flow chart of a second embodiment of a method of operating the vehicle speed limiting and/or controlling system illustrated in FIG. 1.

FIG. 3 is a flow chart of a second embodiment of a method, indicated generally at 40, of operating the vehicle speed limiting and/or controlling system 10 illustrated in FIG. 1. The second embodiment of the method 40 is similar to the first embodiment described above, except that the use of the GPS signals to determine the posted speed limit signal $V_{GPS}$ is omitted. Thus, when using the second embodiment of the method 40, the GPS receiver 13 of the vehicle speed limiting and/or controlling system 10 illustrated in FIG. 1 may be omitted.

In an initial step 41 of the second embodiment of the method 40, the controller 11 reads the signals from the human-machine interface 12. As discussed above, the human-machine interface 12 can generate one or more signals to the controller 11 that are representative of a predetermined maximum speed at which the vehicle is desired to be operated. This predetermined maximum speed (referred to herein as $V_{HMI}$) can be set by a parent of the driver or the owner of the vehicle at any desired magnitude using the human-machine interface 12. For example, the predetermined maximum speed $V_{HMI}$ can be set at 70 m.p.h.

Next, as shown in step 42 of the second embodiment of the method 40, the controller 11 reads the signals from the actual speed sensor 14. As discussed above, the actual speed sensor 14 generates one or more signals to the controller 11 that are representative of the actual speed of the vehicle (referred to herein as $V_{ACT}$).

Next, in an optional step 43 of the second embodiment of the method 40, the controller 11 reads the signals from the human-machine interface 12. As discussed above, the human-machine interface 12 can also generate one or more signals to the controller 11 that are representative of a predetermined differential speed variance from the predetermined maximum speed (referred to herein as $V_{THRESH}$). This predetermined differential speed variance signal $V_{THRESH}$ can be set at any desired magnitude, such as 5 m.p.h. for example. It is contemplated that the human-machine interface 12 can generate signals to the controller 11 that are representative of more than one of the predetermined differential speed variances. For example, the human-machine interface 12 can generate a first predetermined differential speed variance $V_{THRESH1}$ at 5 m.p.h. and a second predetermined differential speed variance $V_{THRESH2}$ at 10 m.p.h.

Assuming that this predetermined differential speed variance signal $V_{THRESH}$ is provided, the second embodiment of the method 40 next enters a decision point 44, wherein it is determined whether the actual speed of the vehicle $V_{ACT}$ is either greater than or less than the calculated maximum speed $V_{MAX}$ (as determined above) minus the predetermined differential speed variance signal $V_{THRESH}$. If the actual speed of the vehicle $V_{ACT}$ is greater than (or, in the illustrated embodiment, greater than or equal to) the calculated maximum speed $V_{MAX}$ minus the predetermined differential speed variance signal $V_{THRESH}$, then the second embodiment of the method 40 branches from the decision point 44 to a step 45, wherein the speed warning alarm 15 is actuated by the controller 11. Thus, the speed warning alarm 15 is adapted to generate an indication to the driver that the actual speed of the vehicle $V_{ACT}$ is approaching the calculated maximum speed $V_{MAX}$. As a result, the driver of the vehicle can take appropriate actions (such as releasing the accelerator pedal or depressing the brake pedal of the vehicle) to avoid exceeding the speed defined by the calculated maximum speed $V_{MAX}$.

Next (or if it is determined in the decision point 44 that the actual speed of the vehicle $V_{ACT}$ is not greater than or equal to the calculated maximum speed $V_{MAX}$ minus the predetermined differential speed variance signal $V_{THRESH}$), the second embodiment of the method 40 enters a decision point 46, wherein it is determined whether the actual speed of the vehicle $V_{ACT}$ is either greater than or less than the calculated maximum speed $V_{MAX}$. If the actual speed of the vehicle $V_{ACT}$ is greater than (or, in the illustrated embodiment, greater than or equal to) the calculated maximum speed $V_{MAX}$, then the second embodiment of the method 40 branches from the decision point 46 to a step 47, wherein the speed control actuator 16 is actuated by the controller 11. Thus, the speed control actuator 16 is actuated to either limit and/or otherwise control the actual speed of the vehicle $V_{ACT}$ so that it does not exceed the calculated maximum speed $V_{MAX}$. To accomplish this, the speed control actuator 16 can cause appropriate actions (such as releasing the accelerator pedal or depressing the brake pedal of the vehicle) to avoid exceeding the speed defined by the calculated maximum speed $V_{MAX}$.

Next (or if it is determined in the decision point 46 that the actual speed of the vehicle $V_{ACT}$ is not greater than or equal to the calculated maximum speed $V_{MAX}$), the second embodiment of the method 40 returns to the step 41. Thus, the method 40 is continuously repeated as the vehicle is operated.

The principle and mode of operation of this invention have been explained and illustrated in its preferred embodiments.

However, it must be understood that this invention may be practiced otherwise than as specifically explained and illustrated without departing from its spirit or scope.

What is claimed is:

1. A system comprising:
   a GPS receiver that generates a signal that is representative of a posted speed limit where a vehicle is located at a point in time when the vehicle is being operated;
   a device that generates a signal that is representative of an actual speed of the vehicle at the point in time; and
   a controller that is responsive to the GPS receiver signal and the actual speed signal for either (1) generating an alarm or (2) limiting or otherwise controlling the speed of the vehicle when the actual speed of the vehicle is greater than the posted speed limit, wherein the system includes either:
   a device that generates a signal that is representative of a single predetermined maximum speed for the vehicle which the vehicle is prevented from exceeding at the point in time, and wherein the controller (1) generates the alarm or (2) limits or otherwise controls the speed of the vehicle when the actual speed of the vehicle is greater than the lesser of the posted speed limit and the single predetermined maximum speed; or
   a device that generates a signal that is representative of a predetermined differential speed variance from the single predetermined maximum speed, and wherein the controller (1) generates the alarm when the actual speed of the vehicle is greater than the posted speed limit less the single predetermined differential speed variance and (2) limits or otherwise controls the speed of the vehicle when the actual speed of the vehicle is greater than the posted speed limit.

2. The system defined in claim 1 wherein the device that generates the actual speed signal is an actual speed sensor provided on the vehicle.

3. The system defined in claim 1 wherein the device that generates the actual speed signal is the GPS receiver.

4. The system defined in claim 1 wherein the device that generates the actual speed signal is the controller.

5. The system defined in claim 1 wherein the system includes a device that generates a signal that is representative of a single predetermined maximum speed for the vehicle which the vehicle is prevented from exceeding at the point in time, and wherein the controller (1) generates the alarm or (2) limits or otherwise controls the speed of the vehicle when the actual speed of the vehicle is greater than the lesser of the posted speed limit and the single predetermined maximum speed.

6. The system defined in claim 5 wherein the device that generates the single predetermined maximum speed signal is a human-machine interface.

7. The system defined in claim 1 wherein the system includes a device that generates a signal that is representative of a predetermined differential speed variance, and wherein the controller (1) generates the alarm when the actual speed of the vehicle is greater than the posted speed limit less the predetermined differential speed variance and (2) limits or otherwise controls the speed of the vehicle when the actual speed of the vehicle is greater than the posted speed limit.

8. The system defined in claim 7 wherein the device that generates the predetermined differential speed variance signal is a human-machine interface.

9. The system defined in claim 1 further including (1) a device that generates a signal that is representative of a single predetermined maximum speed for the vehicle which the vehicle is prevented from exceeding at the point in time, and (2) a device that generates a signal that is representative of a predetermined differential speed variance, and wherein the controller generates the alarm when the actual speed of the vehicle is greater than the lesser of either (1) the single predetermined maximum speed less the predetermined differential speed variance or (2) the posted speed limit less the predetermined differential speed variance.

10. The system defined in claim 9 wherein the controller limits or otherwise controls the speed of the vehicle when the actual speed of the vehicle is greater than the lesser of (1) the single predetermined maximum speed or (2) the posted speed limit.

11. The system defined in claim 10 wherein the device that generates the single predetermined maximum speed signal and the device that generates the predetermined differential speed variance signal are a human-machine interface.

12. A system for controlling the speed of a vehicle comprising:
    a human-machine interface that generates a selectively adjustable signal that is representative of a single predetermined maximum speed for the vehicle which the vehicle is prevented from exceeding at a point in time when the vehicle is being operated;
    a device that generates a signal that is representative of an actual speed of the vehicle at the point in time; and
    a controller that is responsive to the single predetermined maximum speed signal and the actual speed signal for limiting or otherwise controlling the speed of the vehicle when the actual speed of the vehicle is greater than the single predetermined maximum speed.

13. The system defined in claim 12 wherein the device that generates the actual speed signal is an actual speed sensor provided on the vehicle.

14. The system defined in claim 12 wherein the device that generates the actual speed signal is a GPS receiver.

15. The system defined in claim 12 wherein the device that generates the actual speed signal is the controller.

16. The system defined in claim 12 further including a device that generates a signal that is representative of a predetermined differential speed variance from the single predetermined maximum speed, and wherein the controller (1) generates an alarm when the actual speed of the vehicle is greater than the single predetermined maximum speed less the predetermined differential speed variance and (2) limits or otherwise controls the speed of the vehicle when the actual speed of the vehicle is greater than the single predetermined maximum speed.

17. The system defined in claim 16 wherein the device that generates the predetermined differential speed variance signal is a human-machine interface.

18. The system defined in claim 1 wherein the controller is responsive to the GPS receiver signal and the actual speed signal for either (1) generating the alarm or (2) limiting or otherwise controlling the speed of the vehicle when the actual speed of the vehicle is greater than or equal to the posted speed limit.

19. A system comprising:
    a GPS receiver that generates a signal that is representative of a posted speed limit where a vehicle is located at a point time;
    a device that generates a signal that is representative of an actual speed of the vehicle at the point in time when the vehicle is being operated;
    a human-machine interface that generates selectively adjustable signals that are representative of both (1) a single predetermined maximum speed for the vehicle which the vehicle is prevented from exceeding at the point in time and (2) a predetermined differential speed variance from the single predetermined maximum speed; and a controller that is responsive to the posted speed limit signal, the actual speed signal, the single predetermined maximum speed signal, and the selectively adjustable predetermined differential speed variance signal for (1) generating an alarm when the actual speed of the vehicle is greater than the lesser of the single predetermined maximum speed minus the predetermined differential speed variance or the posted speed limit minus the predetermined differential speed variance, and (2) limiting or otherwise controlling the speed of the vehicle when the actual speed of the vehicle is greater than the lesser of the single predetermined maximum speed or the posted speed limit.

* * * * *